INVENTORS
JESSE ARONSTEIN
GEORGE A. CACCOMA

BY Joseph L. Spiegel
ATTORNEY

United States Patent Office
3,427,517
Patented Feb. 11, 1969

3,427,517

ORIENTING AND CONTACTING DEVICE

Jesse Aronstein and George A. Caccoma, Poughkeepsie, N.Y., assignors to International Business Machines Corporation, Armonk, N.Y., a corporation of New York Original application Dec. 23, 1964, Ser. No. 420,594, Divided and this application May 19, 1966, Ser. No. 565,653
U.S. Cl. 317—262 6 Claims
Int. Cl. H01g *13/00;* H01h *49/00;* H02b *3/00*

This invention relates to electronic devices and more particularly to an apparatus for automatically feeding, orienting and contacting electronic devices. This application is a division of copending application Ser. No. 420,-594 filed Dec. 23, 1964 and now abandoned.

During the manufacture of miniature electronic devices such as chip-type semiconductors, the inclusion of manual handling, orienting, contacting or sorting steps considerably slows the overall production capability. Nevertheless, the size of the semiconductor elements being handled makes the design of automatic machinery for the performance of these operations extremely difficulty and expensive. A major problem in the design of such machinery is that, due to the fragility of the semiconductor devices, the machinery destroys many semiconductor devices during the course of its operations.

It is an object of the invention, therefore, to provide a new and improved mechanism for automatically orienting electrical devices.

It is a further object of the invention, therefore, to provide a new and improved mechanism for automatically orienting and contacting electrical devices.

It is another object of the invention to provide an improved mechanism for automatically feeding a semiconductor chip to a plurality of work stations for the purpose of orienting and contacting the chip.

It is an additional object of this invention to provide a new and improved semiconductor chip feeding and orienting mechanism which is capable of reliable high speed automatic operation without injury to the chips.

It is still another object of this invention to provide an improved semiconductor chip orientation sense mechanism.

It is yet another object of this invention to provide an improved means for sensing the orientation of a semiconductor chip and causing said orientation to be changed to a desired orientation.

A still further object of the invention is to provide a semiconductor chip contactor which does not harm the chip when making electrical contact thereto.

In accordance with the above-stated objects, the fact is utilized that the semiconductor devices being handled are characteristically provided with a plurality of contacts, at least one of the contacts distinctively arranged with respect to the others. The invention provides means for transporting these semiconductor devices through a plurality of stations, the transporting means being adapted to carry the semiconductor devices so that their contacts are arranged in any one of a number of preset orientations. The transporting means moves each semiconductor device to a contact orientation sense station which includes a plurality of lever sense means adapted to receive a semiconductor device. In each of the preset orientations of a semiconductor device, the distinctively placed contact reacts with at least one lever means to move it and cause a signal to be generated indicative of the movement. A subsequent orientor station senses the signal and in response thereto, orients the semiconductor device so that its contacts are properly positioned to be electrically contacted. A further test station is provided which includes a contactor comprising a plurality of independently mounted conductive lever means, each lever means biased to connect to a contact with a predetermined pressure so as not to damage the semiconductor device or its contacts.

The foregoing and other objects, features and advantages of the invention will be apparent from the following more particular description of a preferred embodiment of the invention, as illustrated in the accompanying drawings:

Figures 1, 6:
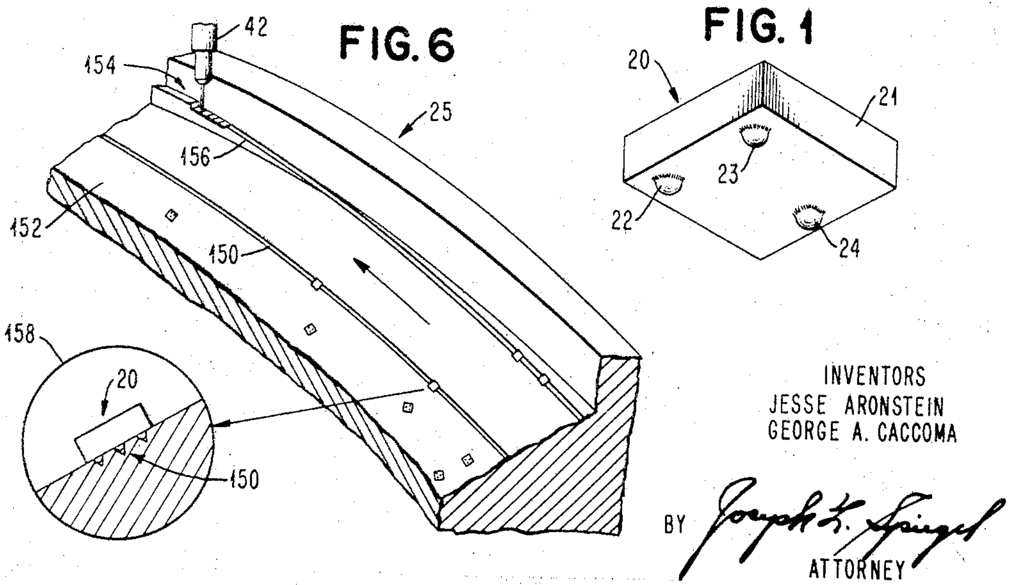
FIG. 1 is an isometric view of a characteristic semiconductor device.
FIG. 6 is a partial isometric section of a vibratory feed bowl adapted to function with the system.

Referring now to FIG. 1, a semiconductor device of the class which can be handled by the invention is chip-type transistor 20 having chip body 21 of a semiconductor material such as silicon or germanium, and protruding contacts 22, 23 and 24. These contacts not only provide electrical connections to the base, collector and emitter junctions of transistor 20, but also, by virtue of their physical characteristics, prevent chip body 21 from touching a surface upon which the transistor is placed. In actual size, transistor 20 may approximate .025 inch on a side and the spacing between contacts 22, 23 and 24 may approximate .015 inch. Each contact may have a diameter of .005 inch. As can be seen, continuous handling and testing of such small elements is a formidable problem.

I. OVERALL DESCRIPTION OF SEMICONDUCTOR CHIP HANDLER

Figure 2:
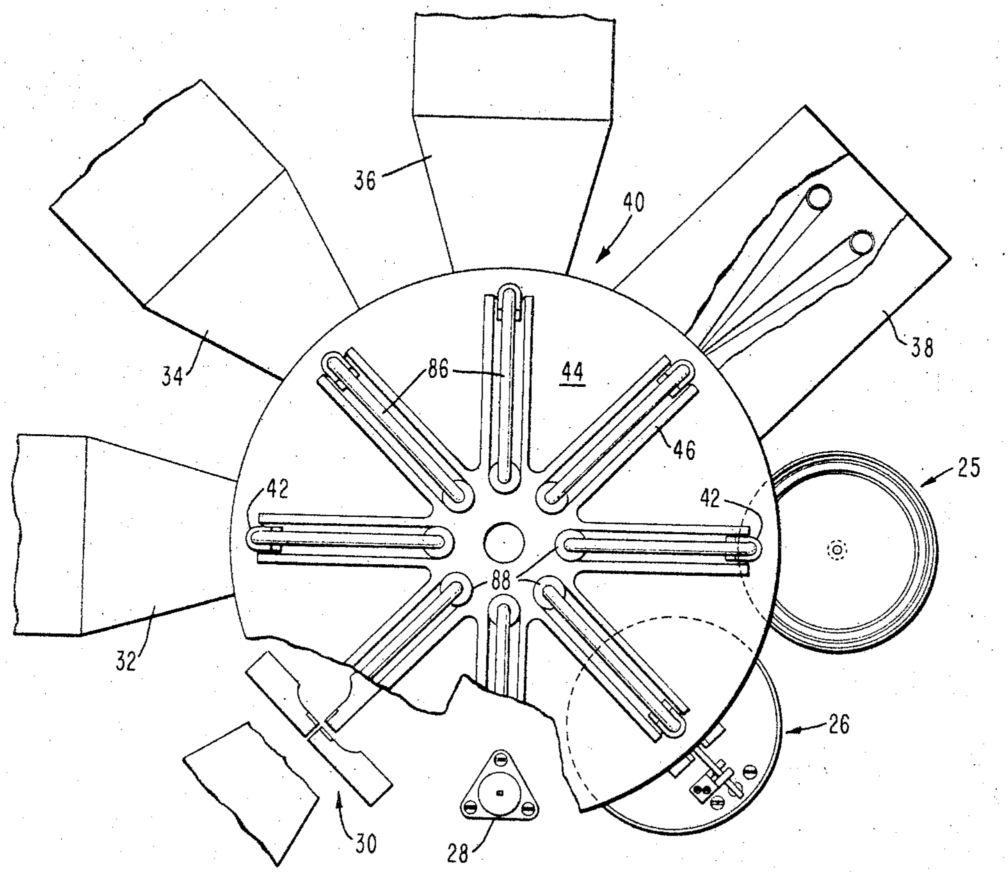
FIG. 2 is a plan view of a semiconductor device handler and tester which forms the subject of this invention.
Figure 3:
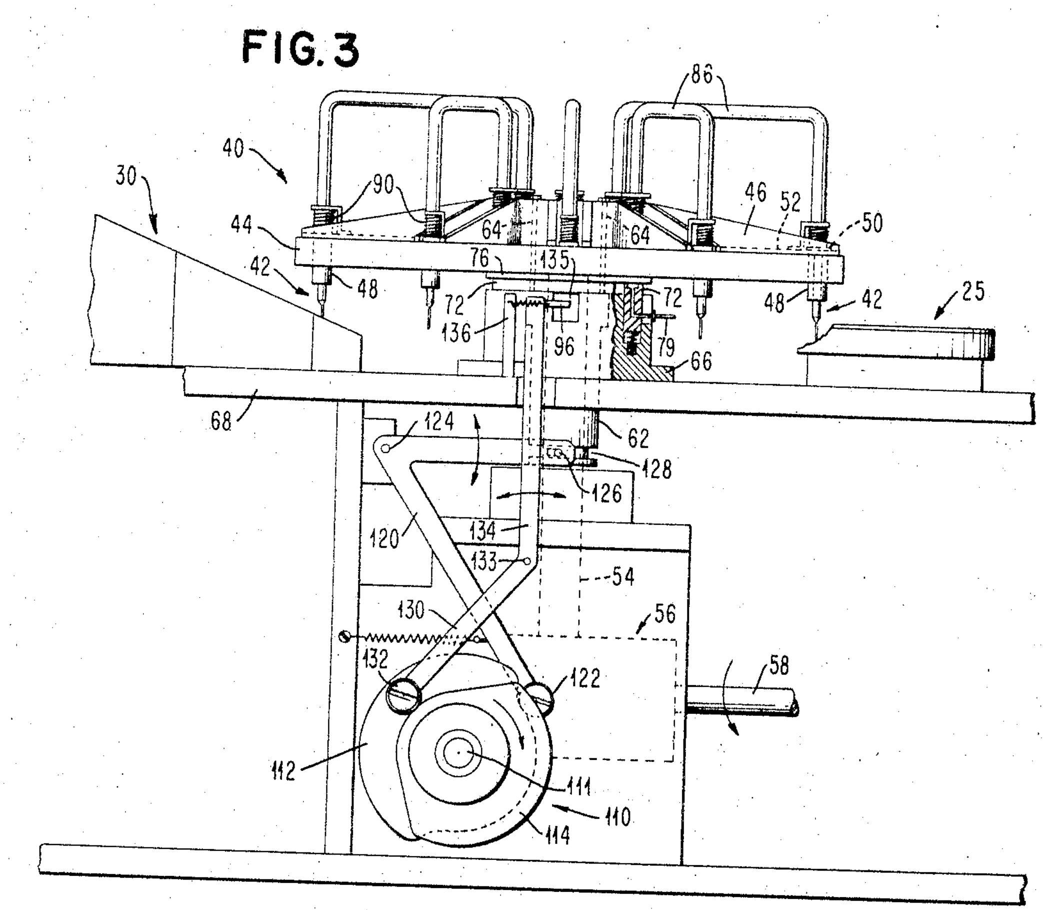
FIG. 3 is a front partial section view of the semiconductor device handler and tester.

As shown in FIG. 2, the chip handler and tester includes eight stations—vibratory feed bowl 25, chip orientation sensor 26, chip orientor 28, chip contactor and test station 30, additional test stations 32, 34 and 36, and vacuum sorter 38. Indexing head 40 provides the means for moving the chips from station to station. The portion of indexing head 40 which transports the separate chips are eight vacuum pencils 42 (FIG. 3). Each vacuum pencil 42 is adapted, when a vacuum is applied to it, to hold a chip and to transport it between stations.

Before proceeding to a more detailed description of the indexing system, the following summary of operations performed by each of the stations will be helpful in understanding the overall operation of the system. Vibratory feed bowl 25 perfoms the function of providing chips to a pick-off point in a queued-up, contacts-down orientation. While the ultimate desire is to test each semiconductor chip, this cannot be done unless the chip's contacts are arranged in a manner which allows them to be contacted by a test station. Vibratory feed bowl 25 is incapable of assuring this required preset orientation. Accordingly, vacuum pencil 42 picks a chip at the pick-off point and carries it to chip orientation sense station 26 which, upon receiving the chip, determines the orientation of the distinctively located protruding contact (in this case, contact 24). A signal is produced indicating the sensed orientation and is transmitted to semiconductor chip orientator station 28. When vacuum pencil 42 next places the chip in chip orientor 28, the chip is rotated to the desired orientation while still held by vacuum pencil 42. When the chip has been oriented, vacuum pencil 42 transports it to test station 30 where specially mounted contact arms connect contacts 22–24 to test circuitry. At subsequent test stations, an identical contact mechanism is provided for succeeding test circuits. The results of the tests are fed to vacuum sorter 38 which takes the chip from vacuum pencil 42 and via a selectively applied vacuum places it in an orifice in accordance with the test results.

Turning now to an overall description of the handler (FIG. 3,) indexing head 40 includes two separate portions, indexing disk 44 and pencil retracting head 46. Fixedly mounted in indexing disk 44 are a plurality of vacuum pencil holding bushings 48. Slidably mounted within each of bushings 48 is a hollow vacuum pencil 42. Each pencil 42 is provided with a collar 50 which is spring biased to bear against surface 52 of retracing head 46. The adjustment of collar 50 controls the lowermost orientation of vacuum pencil 42. As will be seen hereinafter, while both indexing disk 44 and pencil retracting head 46 rotate in the process of moving the vacuum pencils from station to station, pencil retracting head 46 is additionally impelled upwardly and retracts the tip of vacuum pencils 42 to disengage the held chips from the respective stations and allow them to clear all obstacles between stations.

Indexing disk 44 is rigidly attached to shaft 54 which is in turn connected to indexing mechanism 56. Indexing mechanism 56 is powered by shaft 58 which is in turn connected to a motor or other source of rotary power (not shown). The details of indexing mechanism 56 are not shown since such items are commercially available. Basically, such a mechanism provides an intermittent rotary motion to shaft 54 via cam and multiple-follower arrangement. One source of such mechanisms is the Commercial Cam and Machine Company, Chicago 12, Illinois.

Figures 4, 5:
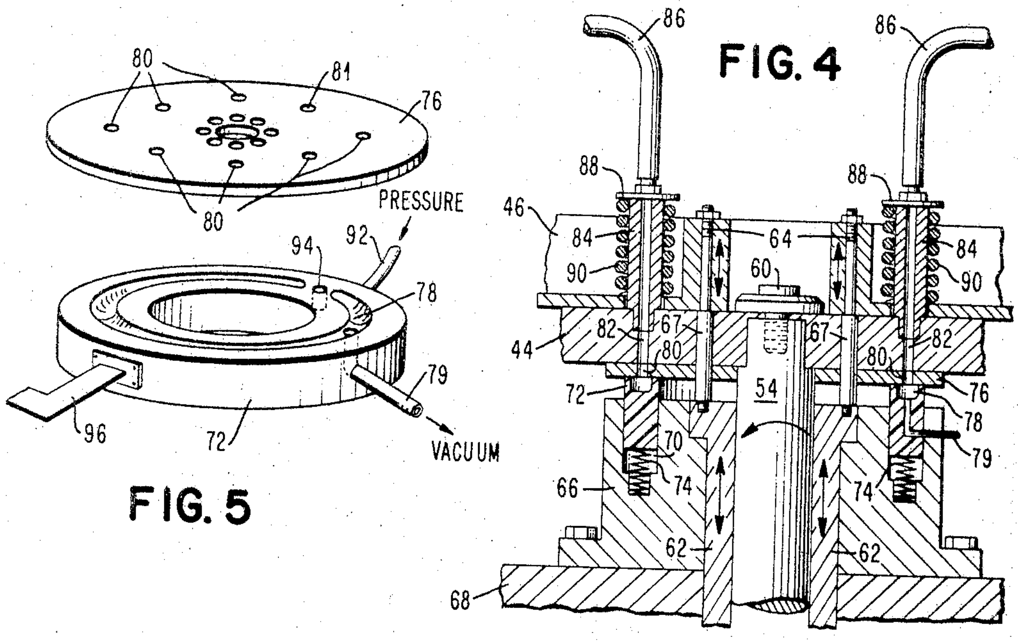
FIG. 4 is an enlarged sectional view of a portion of the apparatus of FIG. 3.
FIG. 5 is an isometric view of a vacuum valve which is incorporated into the apparatus.

In FIG. 4, an enlarged view of the area where shaft 54 connects to indexing disk 44 is shown. As can be seen therein, cap 60 holds indexing disk 44 onto the upper end of shaft 54. Collar 62 is slidably mounted on shaft 54 and is in turn connected via pins 64 to retracting head 46. A spacer 67 is slidably mounted within indexing disk 44 and encompasses each pin 64. While eight such pins are provided, only two are shown in FIG. 4.

Collar 62 is slidably and rotatably mounted in casting 66. Casting 66 is in turn fastened to rigid member 68 which forms a portion of the frame of the machine. Casting 66 is provided with a circumferential groove 70 wherein there is seated a resilient vacuum valve member 72. Resilient member 72 is biased upwardly against valve plate 76 by a plurality of springs 74. The construction of the vacuum valve is shown in greater detail in FIG. 5. Resilient member 72 is provided with a groove 78 which is connected to a source of vacuum by port 79. Valve plate 76 is provided with a plurality of holes 80 which align with groove 78. A hole 81 also aligns with groove 78 but, as will hereinafter be seen, is switchable from vacuum to pressure. As indexing disk 44 (FIG. 3) rotates, valve plate 76 also rotates and causes the identity of hole 81 to shift to a succeeding hole in the plate. The application of a vacuum to groove 78 provides a vacuum via holes 80 and 81 in valve cover 76 to the eight respective vacuum pencils 42. The vacuum paths can be traced in FIG. 4 from vacuum port 79, to groove 78, hole 80 in vacuum plate cover 76, through orifice 82 in indexing disk 44, through the orifice in rigid tube 84, and via resilient tube 86 to vacuum pencils 42. Each of rigid tubes 84 is fixed in indexing disk 44 and passes through a clearance hole in retracting head 46. Washers 88 and springs 90 provide a positive return force for retracting head 46 during the operation of the machine.

Returning now to FIG. 5, the vacuum is provided with a pressure input via tube 92 and port 94 in resilient member 72. When valve cover 76 is in its normal position over resilient member 72 holes 80 and 81 align with groove 78 and pressure port 94 does not align with any hole. However, pusher member 96, which is fixedly attached to resilient member 72 may be impelled to the right to cause resilient member 72 to rotate and thereby align pressure port 94 with hole 81. Instead therefore of a vacuum being applied to hole 81 from groove 78, a positive pressure is there applied. This feature is utilized at the sorting station 38 whereby a chip held on the tip of a vacuum pencil 42 is positively pushed off by the applied pressure and into the vacuum sorting mechanism.

Returning to FIG. 3, it should be remembered that the means for providing the index drive to indexing head 40 is via shaft 54 from indexing mechanism 56. The indexing drive is transmitted to indexing disk 44 by shaft 54. The indexing motion is in turn transmitted to retracting head 46 via pins 64 and spacers 67. The means provided for raising and lowering retracting head 46 and for selectively switching the vacuum and pressure inputs are multiple cam 110 and follower arms 120 and 130. Multiple cam 110 is mounted on shaft 111 and makes one rotation per index of indexing head 40. An internal connection within indexing mechanism 56 transmits the rotary motion of shaft 58 to shaft 111. A plurality of cam operated circuit breakers (not shown) are also mounted on shaft 111 and will be discussed hereinafter in relation to the operation of chip orientor 28.

Multiple cam 110 is composed of two cams, inner cam 112 and outer cam 114, the operations of these cams being essentially complementary. Follower 122 of follower arm 120 rides on the surface of inner cam 112 and follower 132 of follower arm 130 rides on the surface of outer cam 114. Follower arm 120 is hinged at point 124 and is provided at one extremity with an extended pin 126 which rides in slot 128 of collar 62. Remembering that collar 62 is slidably mounted on shaft 54, it will be seen that when follower 122 is pushed in a counterclockwise direction by the camming surface of inner cam 112, follower arm 120 will also so rotate and interact with slot 128 to push collar 62 in an upward direction. This upward movement will be transmitted via pins 64 and spacers 67 through indexing disk 44 to retracting head 46. Retracting head 46 will therefore be raised and will, in turn, raise vacuum pencils 42 to a point where their tips and the chips which they carry, clear any obstacles in the indexing path. The exact opposite will occur when follower portion 122 returns to the low dwell of inner cam 112.

Follower arm 130 is hinged at point 133 and has an extended arm portion 134. Pusher arm 96 of the vacuum valve extends through slot 135 in casting 66 and is biased to the left by a spring which is attached to post 136. When follower 132 rides up on the high dwell of outer cam 114, follower arm portion 134 bears against pusher 96 and rotates resilient vacuum valve member 72 in a counterclockwise direction. This allows the aforementioned alignment of hole 81 with pressure port 94. Subsequently in the index cycle, follower 132 falls to the low dwell on outer cam 114 and allows the spring to return resilient member 72 back to its original state whereby vacuum is applied to all pencils.

II. VIBRATORY BOWL FEEDER

The first function which must be performed by the semiconductor chip handler is that of providing the semiconductor chips to a vacuum pencil pick-off point in a contact-down, squared-off configuration. More particularly, a continuous feed of semiconductor chips must be provided which are oriented in a known manner so that a vacuum pencil will always hold a chip with its contacts exposed in one of a number of predetermined configurations. Vibratory bowl feeder 25 (FIG. 2) provides this function. A large number of chips are placed in the center of the bowl which then proceeds to feed them to a pick-off station. Since the chips are square on a side, the bowl has the capability of providing a chip at a pick-off station in any one of four squared-off orientations. In all cases, a chip is invariably provided to the pick-off station with a contact-down configuration.

Turning now to the sectional view of FIG. 6, vibratory feed bowl 25 is provided with a spiral track 150 which runs along inclined surface 152. A vibratory driver (not shown) provides bowl 25 with a combined rotary and slight vertical vibration. Such vibrators are well known in the art and will not be hereinafter discussed. Track 150 leads to pick-off station 154 via an inclined plane 156. As shown in the enlarged view 158, track 150 comprises a plurality of grooves which are adapted to catch and hold the protruding contacts on the bottom of semiconductor chip 20. Once a chip is so held in a track, the vibratory motion applied to bowl 25 causes the chip to move along track 150 until it finally reaches pick-off station 154. If, on the other hand, a chip is caused to precess along the inclined plane 152 in a contacts-up configuration, the vibratory motion and the incline will combine to cause the chip to slip back down to the central portion of bowl 25. It should be here realized that vibratory feed bowl 25 is shown only schematically and that various camming surfaces and other features are usually included to eliminate misaligned semiconductor chips from track 150.

III. CHIP ORIENTATION SENSOR

Figure 7:
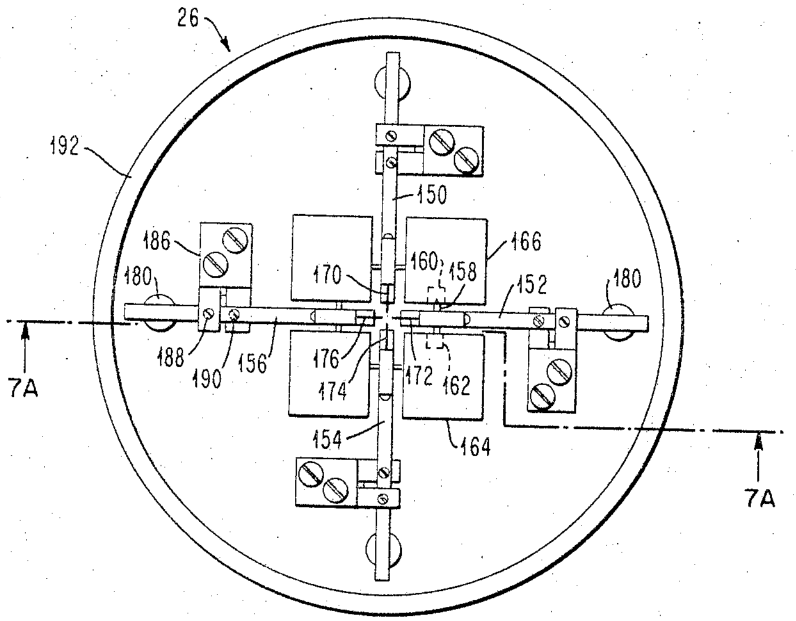
FIG. 7 is a plan view of the semiconductor device orientation sense station with the cover plate removed.
Figure 7A:
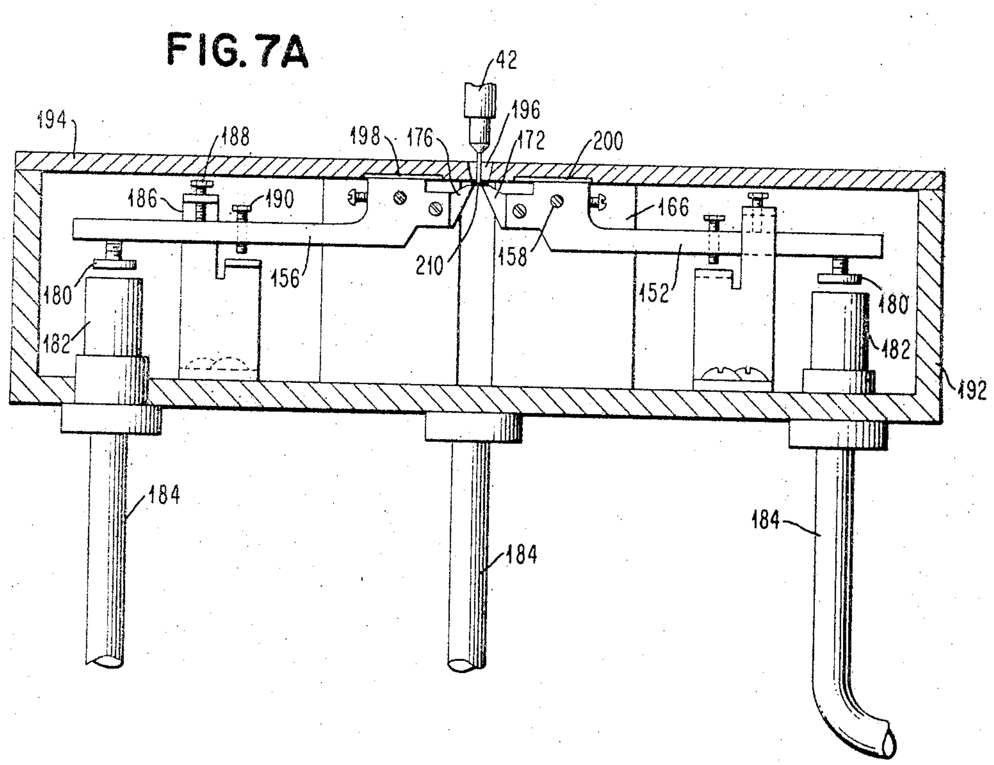
FIG. 7A is a section of the semiconductor device orientation sense station along the line 7A—7A with the cover plate in place.
Figures 8, 10:
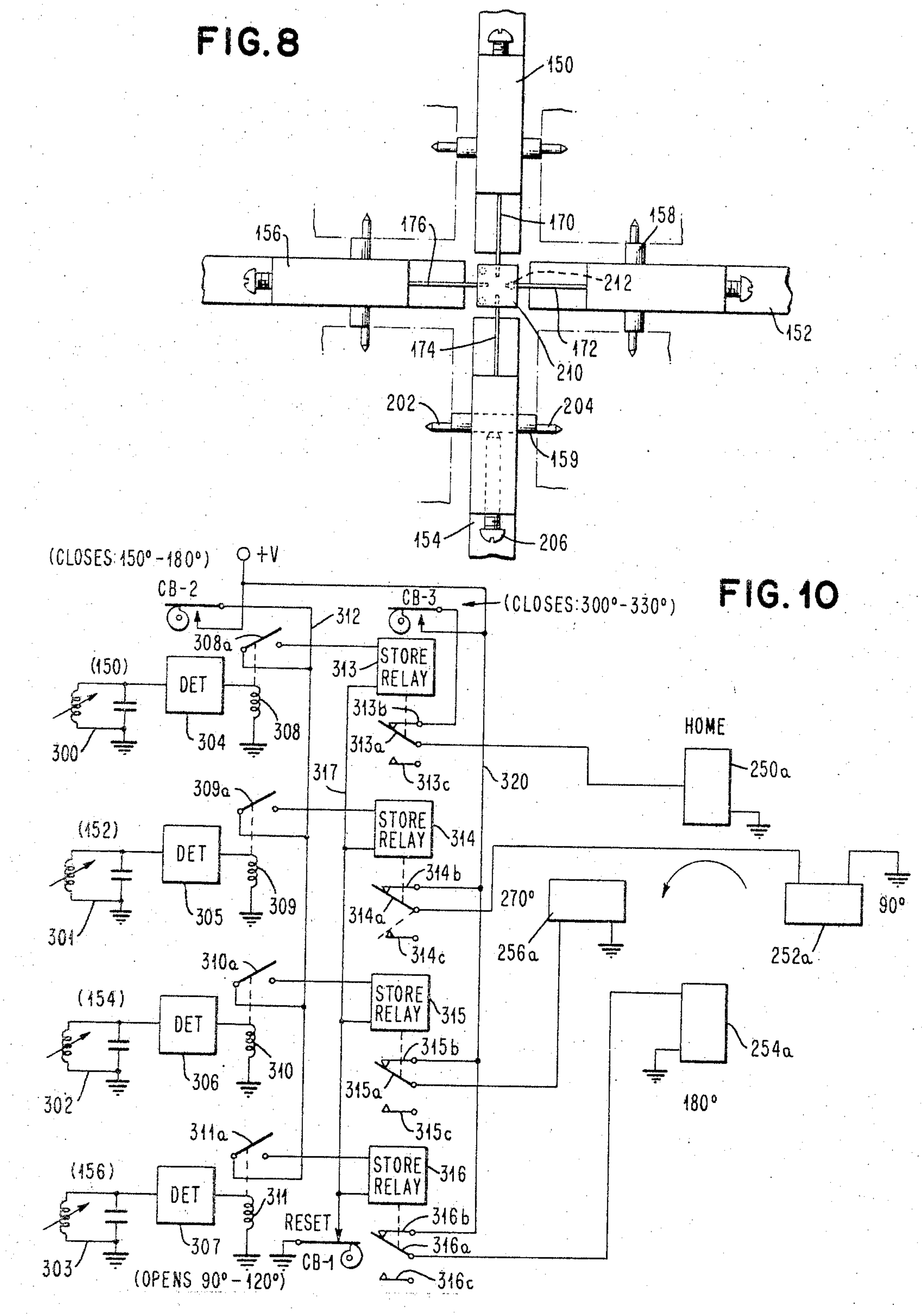
FIG. 8 is an enlarged view of the contact sense arms with a semiconductor device in place.
FIG. 10 is a diagram of the circuit which controls the semiconductor device orientor station.

A semiconductor chip, once it is picked up by vacuum pencil 42, may have its contacts oriented in any of four directions. Before the semiconductor chip is tested, its contacts must be repositioned so that they are properly oriented with respect to the electrical contacts included in a test station. The function of precisely determining the orientation of a chip's contacts is performed by chip orientation sense station 26. A plan view of chip orientation sense station 26 with its cover removed is shown in FIG. 7 and a section thereof along line 7A—7A is shown in FIG. 7A (with the cover in place). An enlarged view of the chip sensing area is shown in FIG. 8.

The main elements of orientation sense station 26 are identical lever arms 150, 152, 154 and 156. An exemplary, lever arm 152 is pivoted on a pivot arm 158 which is journaled in bearings 160 and 162, which are, in turn, embedded in mounting blocks 166 and 164, respectively. Each of the pivot arms of lever arms 150, 154 and 156 are likewise mounted in bearings which are embedded in respective mounting blocks.

Feeler blades 170, 172, 174 and 176 are rigidly mounted at one extremity of each of lever arms 150, 152, 154 and 156, respectively. Mounted at the other extremities of each of these lever arms are ferrite plugs 180. Each ferrite plug is positioned directly over a housing 182 which contains the inductor portion of a tank circuit of an oscillator. Each inductor is connected to its respective oscillator (not shown) via a coaxial cable 184.

A deflection limiter 186 with adjusting screw 188 threaded therein is provided for each lever arm. Screw 188 provides an upper limit for the travel of lever arm 152 whereas screw 190, which is threaded in arm 152, provides the lower travel limit. Housing 192 encloses the entire mechanism. Cover 194 fits over housing 192 and is provided with an orifice 196 into which a semiconductor chip may be placed by a vacuum pencil 42. Cover 194 is also provided with shallow wells 198 and 200 which allow the lever arms to pivot in such a manner that the feeler blades are flush with the underside of orifice 196 when no semiconductor chip is in place.

Referring now to the enlarged view of FIG. 8, lever arm 154 is provided with a pivot arm 159. A pair of eccentrically located pivot points 202 and 204 extend from either end of pivot arm 159. The center section of pivot arm 159 is prevented from rotating with respect to lever arm 154 by set screw 206. Each of the other sense arms 150, 152 and 156 contains a similar pivot arm. These pivot arms provide the capability for adjusting the relative positions of feeler blades 170–176 with respect to orifice 196 and to each other. In other words, by rotating any one of the pivot arms, the respectively connected feeler blade can be made to move in or out from the center point of the mechanism. When it is realized that each of these feeler blades must detect the presence or absence of a protruding contact, that contact having a lateral dimension in the order of .005 inch, the significance of this adjustability feature is realized.

Returning now to FIG. 7A, the nearness of a ferrite tip 180 with respect to its inductor housing 182 controls the frequency of oscillation of the associated oscillator tank circuit connected at the other end of coaxial cable 184 (not shown). Thus, as ferrite tip 180 is moved away from inductor housing 182, the inductance of the coil tends to decrease causing an increase in the frequency of oscillation. On the other hand, if ferrite tip 180 is brought closer to inductor housing 182, the inductance increases causing a decrease in the frequency of oscillation. When no semiconductor chip is in place, lever arms 150, 152, 154 and 156 are positioned at their lowest point of travel. This assures the closest proximity of ferrite tips 180 to inductor housings 182 with resultant lowest frequencies of oscillation. This proximity sensor is only one of any of a number which can be used. A suitable alternative is a "4905 Proximity Control Unit," which is a product of the Electroproducts Laboratory, Inc., Chicago, Ill. In the alternative a simple electrical make and break contact is suitable if the arm deflection is sufficient to assure reliable operation.

Assuming now that vacuum pencil 42 inserts semiconductor chip 210 through orifice 196, the operation of the mechanism will be described. If, as shown in FIG. 8, semiconductor chip 210 is positioned so that its distinctive contact 212 is oriented to the right, feeler blade 172 will be deflected downwardly by the extent of the thickness of protruding contact 212. This will in turn cause lever arm 152 to deflect upwardly with a resultant increase in the frequency of its associated oscillator. This increase in frequency is easily detected and provides an indication of the specific one of the lever arms which was deflected. Each of the other feeler blades is so positioned that it falls between the contacts on the underside of chip 210. It can thus be seen that dependent upon the orientation of distinctive contact 212, one feeler blade will invariably be deflected. The signal resulting from this deflection is detected and utilized to control succeeding chip orientor station 28.

IV. CHIP ORIENTOR

Once the orientation of a semiconductor chip is known, the object is to reorient the chip so that its contacts are properly positioned for connection to the test station. If the chip is found to be oriented properly, no reorientation is required; however, if a chip is found in any one of the other three possible orientations, it must be rotated to the proper orientation.

Figure 9:
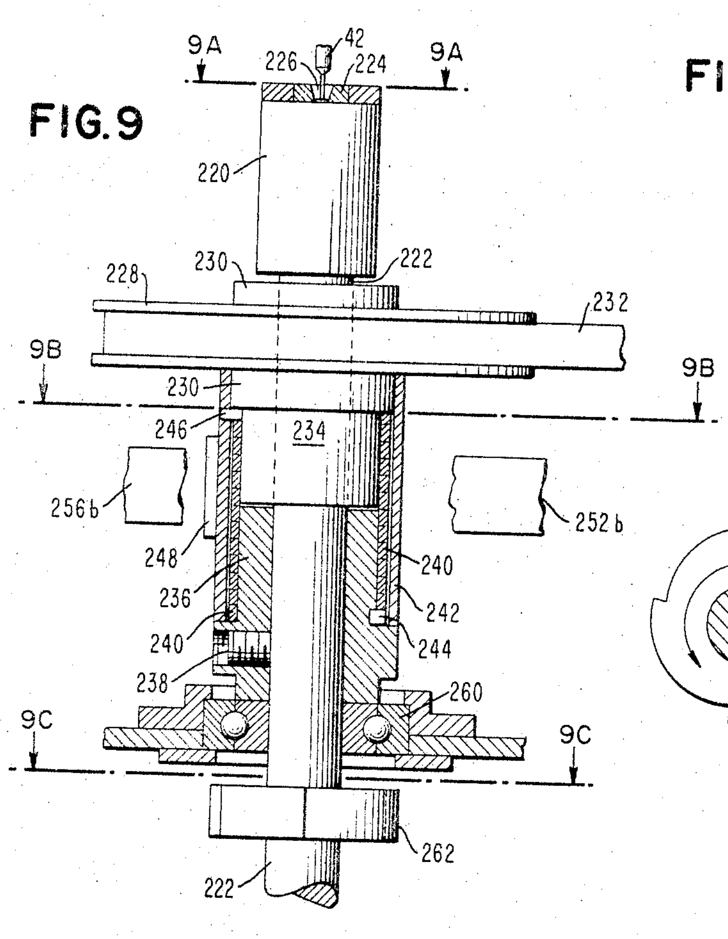
FIG. 9 is a partial section view of the semiconductor device orientor station.
Figure 9A:
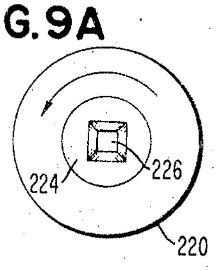
FIG. 9A is a view along line 9A—9A of the topmost portion of the semiconductor device orientor

Referring now to FIG. 9, chip orienting head 220 is rigidly mounted on shaft 222. A portion of chip orienting head 220 has been cut away to show insert 224 which is machined to provide a chip receiving well 226 (see FIG. 9A). Any chip inserted by vacuum pencil into well 226 will be securely held in place at the bottom of the well by the inclined sides of insert 224.

Pulley 228 is rigidly attached to hub 230 and is driven by belt 232, which is in turn continuously driven by a suitable drive mechanism. A smaller diameter portion 234 of hub 230 extends into a spring clutch mechanism (to be hereinafter described). Pulley 228, hub 230 and smaller diameter portion 234 freely rotate on shaft 222 in response to the movement of belt 232. Collar 236 is also mounted on shaft 222 and is rigidly secured thereto by set screw 238. Spring 240 is wound around both collar 236 and hub portion 234. A sleeve 242 encompasses spring 240 and is mounted so as to be rotatable in relation to collar 236 and hub portion 234. Spring 240 has a bent-down section 244 which rigidly attaches it to collar 236 and a bent-up portion 246 which extends through a slot in sleeve 242 and thereby creates a rigid attachment thereto. A stop 248 is attached to the outer surface of sleeve 242 and provides means for disengaging the spring clutch mechanism. The sectional view of FIG. 9B shows stop 248 in greater detail as well as showing bent-up portion 246 of spring 240 extending into a slot in sleeve 242. Also shown in FIG. 9B (not illustrated in FIG. 9) are relay latch mechanisms 250, 252, 254 and 256 which are selectively operable to interact with stop 248 to disengage spring 240 from hub portion 234. Each of relay latches 250, 252, 254 and 256 is provided with a relay coil **250*a*, 252*a*, 254*a* and 256*a* as well as a detent 250*b*, 252*b*, 254*b* and 256*b*. Each of the aforementioned detents is normally spring biased away from its corresponding relay coil. In such configuration, a detent is positioned so as to interact with stop 248 to prevent further rotation of sleeve 242. When a respective relay coil is energized, the associated dentent is retracted and withdrawn from the path of stop 248**.

Figure 9C:
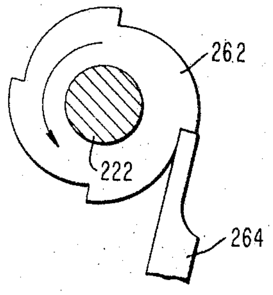
FIG. 9C is a view taken along line 9C—9C of the orientor of FIG. 9.
Figure 9B:
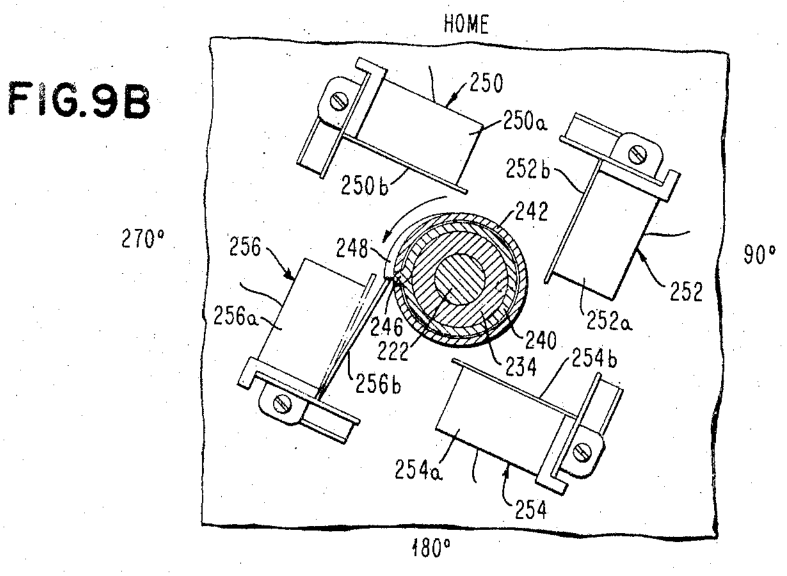
FIG. 9B is a view taken along line 9B—9B of the orientor of FIG. 9.

In the succeeding discussion, it will become apparent that the orienting mechanism of FIGS. 9–9C has for its main object the reorientation of a received semiconductor chip so that the distinctively placed protruding contact is aligned with relay latch 250. For this reason, the position of relay latch 250 is referred to as the home position and the positions of relay latch mechanisms 252, 254 and 256 are referred to as the 90°, 180° and 270° positions, respectively.

Returning now to FIG. 9, the lower end of shaft 222 is journaled in bearing mechanism 260. A like bearing mechanism may also be included between hub 230 and orienting head 220. Mounted immediately below bearing mechanism 260 is ratchet 262, which is more clearly shown in FIG. 9C. Ratchet 262 is provided with four stops which continually engage pawl 264 as shaft 222 rotates in a counterclockwise manner. The purpose of ratchet 262 and pawl 264 is to prevent any reverse rotation of shaft 222 from occurring when one of detents **250*b*–256*b* interacts with stop 248**.

The operation of the orienting mechanism of FIG. 9 can be understood by first assuming that all detents **250*b*, 252*b*, 254*b* and 256*b* are in their retracted position. In this case, the continual rotation of hub portion 234 causes spring 240 to wind tightly around collar 236. This results in a transmission of the drive motion of hub portion 234 through spring 240 to collar 236 thereby imparting a rotary motion to shaft 222 and orienting head 220. If, on the other hand, any one of detents 250*b*–256*b* is extended, it engages stop 248 thereby causing a slight counter rotation to spring 240 through bent-up portion 246. This small counter rotation causes spring 240 to become sufficiently loose around hub portion 234 to prevent the transmission of drive motion therethrough. This action abruptly terminates the rotary movement of collar 236 and shaft 222. Ratchet 262 and pawl 264 interact to prevent any counter rotation of shaft 222** when the above-mentioned action occurs.

V. CHIP ORIENTOR CONTROL CIRCUITRY

In FIG. 10 is shown the interconnecting circuitry between chip orientation sense station 26 and chip orientor station 28. This circuit controls the amount of rotation which chip orienting head 220 imparts to a received semiconductor chip in response to a signal from orientation sense station 26.

The inputs to the circuit are provided via tank circuits 300–303. The inductance portion of each of the aforementioned tank circuits is shown as variable to indicate the changes in inductance which occur as a result of the movement of ferrite plugs 180 with respect to inductor housings 182 (FIG. 7A). Tank circuits 300–303 are respectively associated with lever arms 150, 152, 154 and 156 in chip orientation sense station 26. The output from each tank circuit 300–303 is applied to an associated frequency detector 304–307. If any detector senses an increase in the oscillation frequency of its associated tank circuit (indicating the deflection of one of ferrite heads 180 in an upward direction) it will cause a current to pass through its associated output coil 308–311. The energization of any of coils 308–311 results in the closure of an associated normally open relay switch **308*a*–311*a***. The circuitry contained within such frequency detectors is well known and will not be hereinafter discussed.

A source of positive potential +V is connected via cam operated circuit breaker CB2 and conductor 312 to one side of relay switches **308*a*–311*a*. The other side of each of switches 308*a*–311*a* is respectively connected as an input to a storage relay 313–316. A ground connection is applied to each of storage relays 313–316 via conductor 317 and cam operated circuit breaker switch CB1. Storage relays 313–316 are of the variety which are provided with a holding circuit that retains their energized condition after an input signal has been removed. These relays may be reset by causing circuit breaker CB1 to open ground return line 317**.

Each of storage relays 313–316 is adapted to actuate an associated relay arm **313*a*–316*a*. When any of the storage relays is deenergized, its associated relay arm is spring biased to the up position so that it contacts upper contact points 313*b*–316*b*. When in the actuated state, a storage relay will cause its associated relay arm to contact an open circuited lower contact point 313*c*–316*c*. Each of upper contacts 314*b*–316*b* is connected via conductor 320 to +V, whereas upper contact 313*b* is connected to +V through circuit breaker switch CB3. Relay arms 313*a*–316*a* are respectively connected to an associated relay coil 250*a*, 252*a*, 254*a* and 256*a***. These relay coils are also shown in FIG. 9B.

Figure 11:
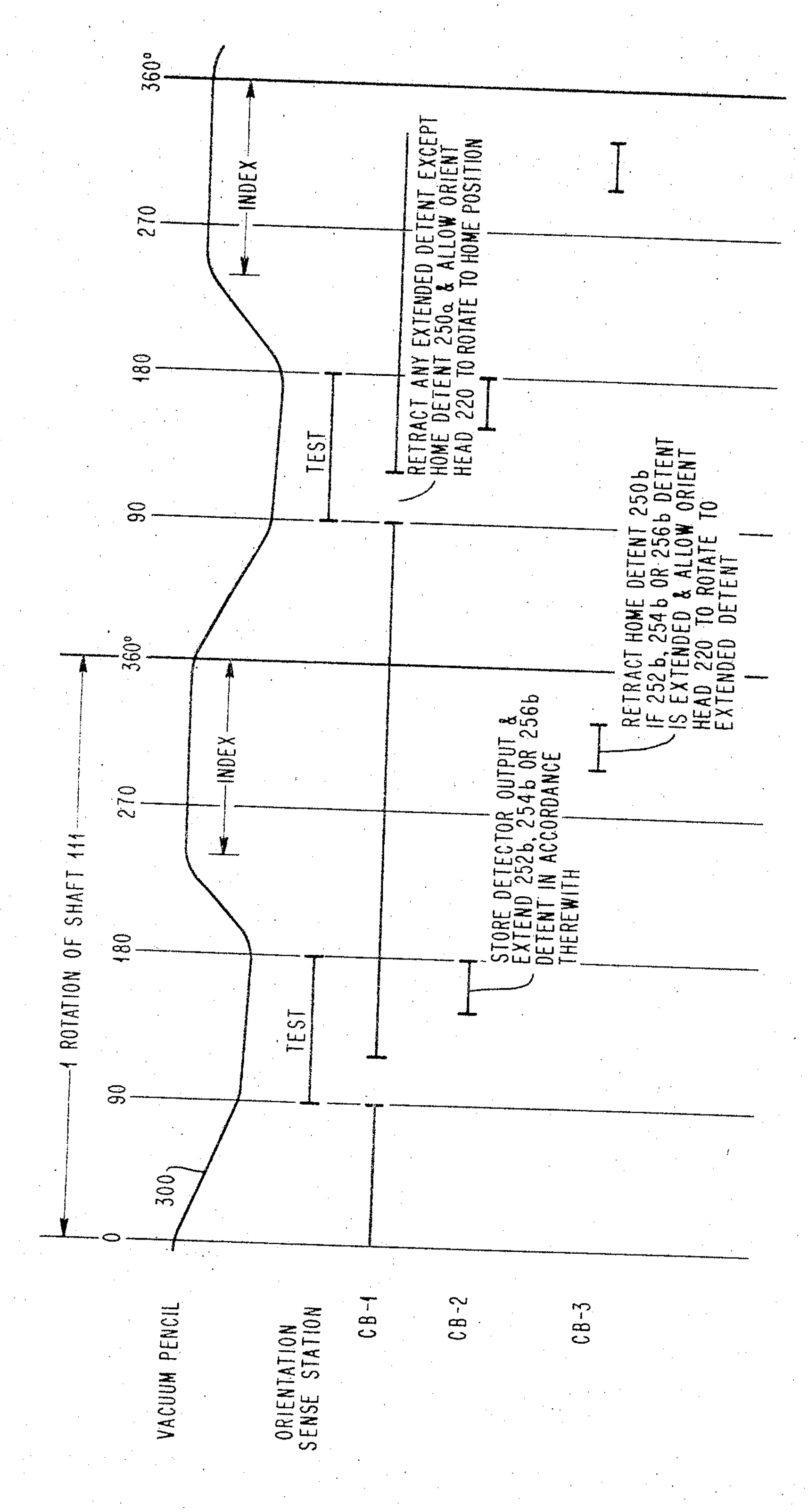
FIG. 11 is a chart describing the operation of the circuit of FIG. 10 and the semiconductor device orientor.

The timing chart of FIG. 11 will be helpful in explaining the operation of the circuit of FIG. 10. As stated during the description of FIG. 3, a plurality of circuit breakers (not shown) are mounted on and actuated by the rotation of shaft 111. In addition, inner cam 112 responds to the rotation of shaft 111 by causing pencil retractor head 46 and in turn vacuum pencils 42, to be lifted and lowered at specific times during the indexing cycle. The action of each vacuum pencil as it responds to these movements is shown by curve 300 in FIG. 11. The horizontal axis of the chart is plotted in degrees of rotation of shaft 111. As can be seen from curve 300 a vacuum pencil dwells at its lowermost position between 90°–180° and at its uppermost position during 240°–360°. During the other portions of an index cycle, the vacuum pencil is either being extended or retracted from a dwell position.

Since all pencils are actuated in unison, it can be seen that a vacuum pencil will invariably place a semiconductor chip into chip orientation sense station 26 at the 90° point of the cycle. In response thereto, one of the lever arms in the sense station will be deflected and will produce a signal output to one of frequency detectors 304–307. Ignoring for a moment the operation of circuit breaker switch CB1 (which is closed at all times except during 90°–120°) home relay coil **250*a* is deenergized due to the open state of CB3 and each of the other relay coils 252*a*, 254*a* and 256*a* are energized. This results in detent 250*b* being extended and all of the remaining detents being retracted. Stop 248 thereby rotates to the home position and is prevented from rotating any further by detent 250*b*. Spring clutch 240 is disengaged and no further driving motion is imparted to shaft 222**.

Assume now that lever arm 152 in orientation sense station 26 is deflected by the distinctive contact of an inserted semiconductor chip. As a result, detector 305 produces an output which energizes coil 309 and closes switch **309*a*. Switches 308*a*, 310*a* and 311*a* remain open. At 150°, circuit breaker switch CB2 is closed by shaft 111 and thereby applies a positive potential via conductor 312 to each of relay switches 308*a*–311*a*. Since only relay switch 309*a* is closed, the positive potential is applied only to storage relay 314 thereby causing relay arm 314*a* to connect to open circuited lower contact 314*c*. The resulting loss of energization in relay coil 252*a* allows detent 252*b* to be extended. At this time, detents 250*b* and 252*b* are extended and detents 254*b* and 256*b* are retracted (due to the energization of relay coils 254*a* and 256*a* through relay arms 315*a* and 316*a*, respectively). At 180°, circuit breaker switch CB2 opens, but storage relay 314** maintains its energized state through its internal holding circuit.

The vacuum pencils are then caused to rise and are indexed to a succeeding station. During the index time, specifically at 300°, circuit breaker switch CB3 closes and applies a positive potential via contact **313*b* to contact arm 313*a*. This in turn results in the energization of relay coil 250*a* and the retraction of extended detent 250*b*. The retraction of detent 250*b* allows spring clutch 240 to engage hub portion 234 of pulley 228 and cause the rotation of shaft 222. Orient head 220 is thereby allowed to rotate 270° until stop 248 engages extended detent 252*b* at the 90° point. The aforementioned engagement results in the declutching of hub portion 234 from shaft 222**.

It can thus be seen that during the time when a chip is being indexed from orientation sense station 26 to chip orientor 28 orient head 220 is rotated to a position which corresponds to the orientation of the chip. All that is then necessary, is to place the specific chip in well 226 and allow orient head 220 to rotate back to its home position. In this manner, the received chip is positioned so that its contacts will connect to the correct electrical contacts at a succeeding test station 30.

The above mentioned action takes place when circuit breaker switch CB1 is caused to open at 90° of the succeeding cycle. The opening of CB1 removes the ground connection from storage relays 313–316 thereby disabling their internal holding circuits and allowing each relay arm to return to its rest position. Since the rest position for each of storage relays 314–316 results in the respective relay arm connecting to its upper contact, each of which is continually powered by the application of a positive potential, the result is the energization of relay coils **252*a*, 254*a* and 256*a* and the retraction of any of the associated detents. In the particular case under consideration, only relay arm 314*a* is moved (relay arms 315*a* and 316*a* already being at their rest positions) and detent 252*b* is thereby retracted. Note that this action also causes relay arm 313*a* to contact upper contact 313*b* but at this particular time in the cycle, contact 313*b* is open circuited and detent 350*b*** remains extended.

All of the above action occurs immediately after the semiconductor chip just previously tested has been placed in well 226 by vacuum pencil 42. The retraction of detent **252*b* allows spring clutch 240 to be engaged and to rotate shaft 222 and orient head 220 to the home position. The rotation of orient head 220 is transmitted to the chip via engagement with the walls of well 226. Since detent 250*b* is extended, stop 248 is only allowed to rotate 90° before it is engaged and disengages spring clutch 240. In this manner, the semiconductor chip is rotated the same 90° while still held on the end of vacuum pencil 42. The chip is thereby oriented and ready for transport to the next station. The operation of the remaining portions of the circuit of FIG. 10 are substantially identical to those above described and will not be hereinafter discussed, except to point out that if a chip is found to be properly oriented, only storage relay 313 is operated and no orienting movement is imparted when the chip is placed in orient head 220**.

VI. CHIP CONTACTOR

Figure 12:
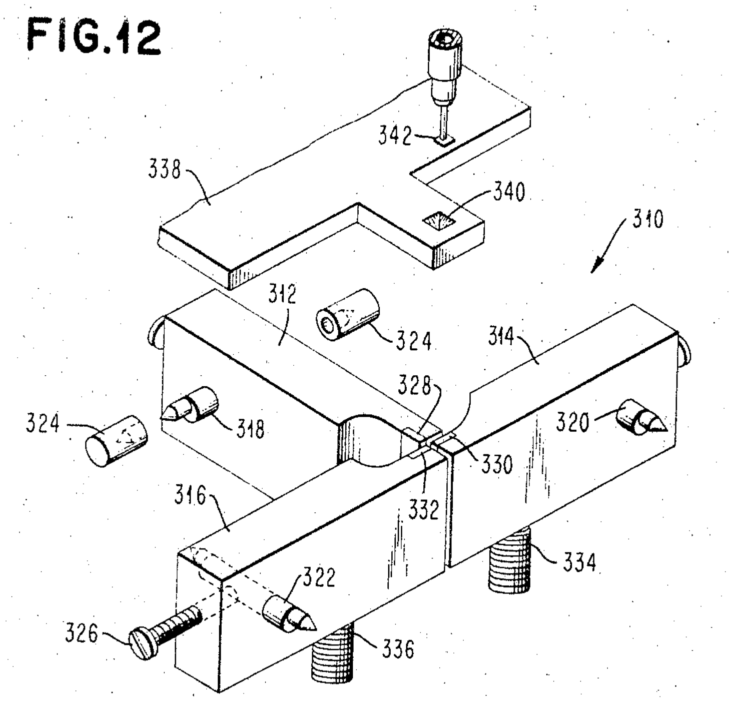
FIG. 12 is an exploded view of the semiconductor device contactor.

Once a semiconductor chip has been oriented, it is then subjected to a plurality of electrical tests to determine its characteristics and suitability for subsequent use. Each test station includes a chip contactor 310 (FIG. 12) which provides the means for connecting to the aligned protruding contacts on the under side of a chip.

The basic components of chip contactor 310 are contact arms 312, 314 and 316, each of which is pivoted on offset pivot arms 318, 320 and 322, respectively. The offset needle pivot points of each of pivot arms 318, 320 and 322 are journaled in bearings, e.g., 324, which are in turn supported within a rigid fixture (not shown). A set screw 326 bears against the interior portion of each pivot arm, e.g., 322, and prevents it from rotating with respect to its associated contact arm 316. Each of pivot arms 318, 320 and 322 perform identical functions for their respective contact arms as pivot arm 158 performs for lever arm 152 in FIG. 8. A conductive insert 328, 330 and 332 is provided at one extremity of each of contact arms 312, 314 and 316.

In this embodiment, contact arms 312, 314 and 316 are fabricated from a nonconductive plastic material which has good dimensional stability (e.g., polystyrene). Conductive inserts 328, 330 and 331 perform the function of providing electrical contact to the protruding contacts. While not shown, conductors are attached to each of conductive inserts 328, 330 and 332 and lead to the test circuitry with which chip contactor 310 is associated. Each of contact arms 312, 314 and 316 is biased upwardly via a spring, e.g., 334, 336, which acts to level member and additionally provides a resilient support mechanism which yields when a chip is placed on conductive inserts 328, 330 and 332. A preferably nonconductive cover 338 shields the contact mechanism and is provided with a chip receiving well 340. When in the assembled form, well 340 provides a guide for an inserted chip, e.g., 342, so that its contacts are precisely brought into position over conductive inserts 328, 330 and 332.

Figure 13:
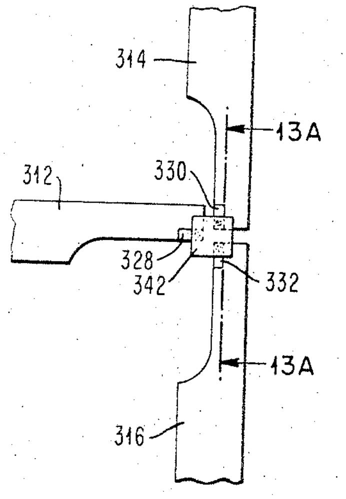
FIG. 13 is an enlarged plan view of the contacting heads of FIG. 10 with a semiconductor device in place.
Figure 13A:
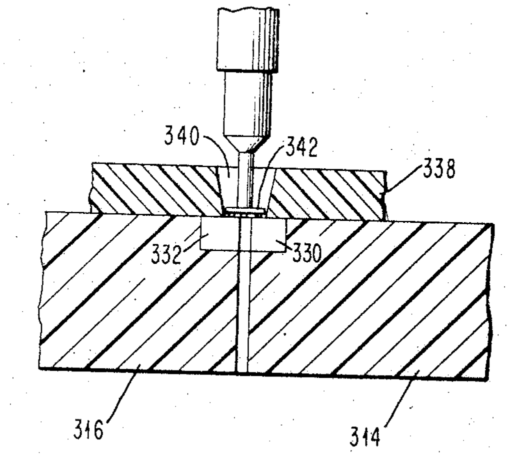
FIG. 13A is a partial section view along line 13A—13A of the contactor of FIG. 13.

An expanded view of the contact area with a chip in position is shown in FIG. 13. Note, that each conductive insert connects only to a single contact on chip 342. A further important point is that when chip 342 is placed in position over conductive inserts 328, 330 and 332, the fact that each of these inserts is separately mounted allows each of one to make good electrical contact with a predetermined amount of force. FIG. 13A shows a side view of chip 342 in place over conductive inserts 330 and 332. From FIGS. 13 and 13A, it should be apparent that the adjustability feature provided by offset pivot arms 318, 320 and 322 is of extreme importance with respect to the contact mechanism due to the smaller areas which have to be contacted and their proximity.

While the invention has been particularly shown and described with reference to a preferred embodiment thereof, it will be understood by those skilled in the art that various changes in form and detail may be made therein without departing from the spirit and scope of the invention.

What is claimed is:

1. In an orientation sensor adapted to receive a device and produce a signal indicative of which one of a plurality of orientations the device occupies, said device provided with a plurality of contacts, at least one said contact arranged distinctively with respect to the other contacts, said sensor comprising:

a plurality of resilient sense means adapted to receive said device, one each of said means positionally aligned with said distinctive contact in each of said plurality of orientations, the receipt of a device causing the sense means which is aligned with said distinctive contact to be moved; and means for sensing which of said plurality of sense means is moved and producing an indication of said movement.

2. In an orientation sensor, adapted to receive a semiconductor device and produce a signal indicative of which one of a plurality of orientations the device occupies, said device provided with a plurality of contacts, at least one said contact arranged distinctively with respect to the other contacts, said sensor comprising:

a plurality of pivoted sense means adapted to receive said device, one each of said sense means positionally aligned with said distinctive contact in each of said plurality of orientations, the receipt of a device causing the sense means which is aligned with said distinctive contact to be rotated about said pivot; and means for sensing which of said plurality of sense means is moved and producing a signal indicative of said movement.

3. In an orientation sensor adapted to receive a semiconductor chip and produce a signal indicative of which one of a plurality of orientations the chip occupies, said chip provided with a plurality of extended contacts, at least one said contact arranged distinctively with respect to the other contacts, said sensor comprising:

a plurality of pivoted sense arms adapted to receive said chip, one each of said sense arms positionally aligned with said distinctive contact in each of said plurality of orientations, the receipt of a chip causing the sense arm which is aligned with said distinctive contact to be rotated about said pivot;

a ferrite plug mounted at the one extremity of each said sense arm; and means for sensing the movement of a plug and producing a signal indicative of said movement.

4. The invention as in claim 3 wherein each sense arm is mounted on a pivot arm which is provided with eccentric pivot points, said pivot arms being rotatable with respect to an associated arm to effect a positional adjustment thereof.

5. A connector for providing electrical connections to a plurality of closely spaced semiconductor device contacts, comprising:

a plurality of conductive lever arms arranged to receive a semiconductor device, a portion of each said arms disposed to connect to a device contact;

bearing means associated with each said lever arm;

a pivot arm for each said lever arm, each said pivot arm provided with a pair of eccentric pivot points which mate with said bearing means, said pivot arm adapted to be rotated with respect to an associated lever arm to vary the location of said contact connecting portion of said lever arm; and means for separately biasing each said lever arm to provide a preset contact pressure when a semiconductor device is in place.

6. A connector for providing electrical connections to a planar semiconductor chip, said chip provided with a plurality of closely spaced protruding contacts, comprising:

a plurality of lever arms arranged to receive a semiconductor chip, each said arm provided with a conductive portion disposed to connect to a protruding contact;

bearing means associated with each said lever arm;

a pivot arm for each said lever arm, each said pivot provided with a pair of eccentric pivot points which mate with said bearing means, said pivot arm adapted to be rotated with respect to an associated lever arm to vary the location of said conductive portion of said lever arm with respect to like conductive portions of other lever arms; and spring means for separately biasing each said lever arm to provide a preset connecting pressure to a chip contact when a semiconductor chip is in place.

References Cited

UNITED STATES PATENTS

| | | | |
|---|---|---|---|
| 2,532,005 | 11/1950 | Bascetta | 200—61.41 |
| 2,547,214 | 4/1951 | Sowes | 200—61.41 |

LEE T. HIX, *Primary Examiner.*

U.S. Cl. X.R.

324—158; 340—222, 282